(12) United States Patent
Lin

(10) Patent No.: US 7,715,359 B2
(45) Date of Patent: May 11, 2010

(54) METHOD FOR REALIZING METERING PULSE IN NGN

(75) Inventor: Yangbo Lin, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 538 days.

(21) Appl. No.: 10/589,444

(22) PCT Filed: Sep. 9, 2005

(86) PCT No.: PCT/CN2005/001443

§ 371 (c)(1),
(2), (4) Date: Aug. 11, 2006

(87) PCT Pub. No.: WO2006/034628

PCT Pub. Date: Apr. 6, 2006

(65) Prior Publication Data

US 2007/0165601 A1     Jul. 19, 2007

(30) Foreign Application Priority Data

Sep. 30, 2004   (CN) ................. 2004 1 0079087

(51) Int. Cl.
*H04J 3/16* (2006.01)

(52) U.S. Cl. .............. 370/346; 379/114.28; 455/406

(58) Field of Classification Search ............... None
See application file for complete search history.

(56) References Cited

U.S. PATENT DOCUMENTS 4,582,957 A * 4/1986 Hayes et al. ............... 379/74
7,283,198 B2 * 10/2007 Kuo .......................... 355/30
2004/0028206 A1 * 2/2004 Freyman et al. ............ 379/219
2005/0069061 A1 * 3/2005 Petzold et al. ............. 375/343
2005/0135578 A1 * 6/2005 Ress et al. ................. 379/124

FOREIGN PATENT DOCUMENTS

| EP | 1 439 675 | 7/2004 |
| EP | 1 545 115 | 6/2005 |
| JP | 2001-197222 | 7/2001 |
| JP | 2003-274041 | 9/2003 |
| WO | WO 02/05538 | 1/2002 |
| WO | WO 03/056753 | 7/2003 |

OTHER PUBLICATIONS

"Gateway control protocol: Enhanced analog lines packages." ITU-T. International Telecommunication Union. CH., No. H248.26. Jul. 14, 2003.
"Extended MGCP Line Packages." Sassenberg Nortel Networks T. IETF Standard-Working-Draft, Internet Engineering Task Force. Jul. 2004.
"Network call signaling protocol for the delivery of time-critical services over cable television networks using cable modems." ITU-T. International Telecommunication Union. CH, No. J.162 2001 Amendment. Feb. 1, 2002.

* cited by examiner

*Primary Examiner*—Hong Cho
*Assistant Examiner*—Ajay P Cattungal
(74) *Attorney, Agent, or Firm*—Darby & Darby

(57) ABSTRACT

A method for realizing metering pulses in Next Generation Network (NGN), which enables an MGC (media gateway controller) to cooperate with an MG (media gateway), so as to realize the metering pulse service. When it is necessary to initiate the charging, the MGC transmits the metering pulse signal to the MG, and then the MG transmits the first metering pulse to the user equipment immediately, and periodically transmits the subsequent pulses according to the Pulse Count and Pulse Interval specified by the signal parameter.

6 Claims, 2 Drawing Sheets

METHOD FOR REALIZING METERING PULSE IN NGN

CROSS-REFERENCE TO PRIOR APPLICATIONS

This application is a U.S. National Phase application under 35 U.S.C. §371 of International Application No. PCT/CN2005/001443, filed Sep. 9, 2005, and claims benefit to Chinese patent application No. 200410079087.2, filed Sep. 30, 2004. The International Application was published in Chinese on Apr. 6, 2006 as WO 2006/034628 A1 under PCT Article 21 (2).

FIELD OF THE INVENTION

The present invention relates to the Next Generation Network (NGN), and particularly to the supporting of the NGN to the conventional pulse metering service.

BACKGROUND OF THE INVENTION

Among all reports regarding the latest advances of communication technologies, the Next Generation Network (NGN) and the Third Generation mobile communication (3G) are undoubtedly the two realms attracting the most attention.

The definition of the NGN has varied all the time during its development. In the "Global NGN Summit 2004" sponsored by the International Telecommunication Union (ITU), a standard NGN is defined as a packet based network that can provide various services including telecommunications services and can use transport technologies that may provide a variety of wide bands and a Quality of Service (QoS), thus establishing the ultimate orientation and scope for the advancement of the NGN.

In fact, the NGN is also the foundation for bearing future 3G services, and holds a particularly important place among future telecommunication networks. Therefore, global telecommunication standardization organizations, major telecommunication operators and telecommunication equipment providers each devote huge amounts of labor and money to the improvements of NGN technologies, and various NGN commercial trial offices have been put into use by some global operators, a success of which may accelerate the advancement of the NGN in turn.

In view of the deployment of the current NGN, a Media Gateway Controller (MGC) and a Media Gateway (MG) are substantially the two essential components usually used for networking. Here, the MGC is responsible for the call controlling function and the MG is responsible for the service bearing function, thus enabling the separation of the call-controlling plane from the service-bearing plane. These two planes can evolve independently from each other, and hence share network resources sufficiently, leading to a simplification of device updates and service extensions and also a reduction of development and maintenance costs.

FIG. 1 shows the networking mode of an MG and an MGC in the NGN. As shown, a protocol network 1 is a transport network for all protocols, a media gateway controller 10 interfaces with a media gateway 11 via a media gateway control protocol 110, and the media gateway controller 10 interfaces with a media gateway 12 via a media gateway control protocol 120.

The media gateway 11 and the media gateway 12 are connected via a real-time transport protocol 140 under the control of the media gateway controller 10. An internet protocol 130 bears the transport of the media gateway control protocol 110, the media gateway control protocol 120 and the real-time transport protocol 140 in the protocol network 1. A user terminal 13 has an access to the protocol network 1 through the media gateway 11, and a user terminal 14 has an access to the protocol network 1 through the media gateway 12. An interaction between the user terminal 13 and the user terminal 14 may be enabled via the various devices and the protocols between the various devices in the protocol network 1.

As seen from FIG. 1, in addition to the two essential components of MGC and MG, the media gateway control protocols therebetween plays a significant role in the network. Two media gateway control protocols widely used at present are the H.248/MeGaCo (Gateway Control Protocol) and the MGCP (Media Gateway Control Protocol).

The MGCP is a media gateway control protocol established by the Internet Engineering Task Force (IETF) in 1999, and the abstract model defined by the MGCP includes two main concepts of "Endpoint" and "Connection".

The Endpoint is a data source or sink, which may be a physical or virtual endpoint. The Endpoint represents an entity providing a certain function on an MG, and as well known to those skilled in the art, such entities may include a Time Division Multiplex (TDM) channel, a digital channel, an analogous line, a recording server access point and an interactive voice response access point.

The Connection represents a call-related resource combination on an MG, for example, an association of a TDM channel with a Real-time Transport Protocol (RTP) stream, and the like. It shall be noted that the Connection may be a uni-connection (e.g. in the case one TDM channel is associated with one RTP stream) or multi-connection (e.g. in the case one TDM channel is associated with a plurality of RTP streams). A continuation of a call is essentially an operation for both an endpoint and a connection based upon such abstract models of the protocol.

An MGC and an MG interact with each other through a Command request and a response. The MGC can request to be informed by the MG upon detection of certain events such as an occurrence of Off Hook, On Hook, Flash Hook or Dialing, etc. or can request a loading of certain signals onto an Endpoint, such as Dialing Tone, Ring-Back Tone, Busy Tone and the like.

The parameters with service dependencies are logically aggregated as a package, and as well known to those skilled in the art, a package includes events and signals and is supported by a specific endpoint. Particularly, each event or signal may be indicated with a "PackageName/EventName" or a "PackageName/SignalName", each kind of endpoints has a specific package, each package contains regular events and signals, and the package name and the event name or the signal name are both represented by a character string.

The common networking modes and the common communication protocols between the essential components of the NGN have been described as above. It shall be particularly noted that any new technology for a communication network shall offer a support to the original services without exception of the NGN. The metering pulse was ever one of important services in the Public Switched Telephone Network (PSTN), and mainly used for the charging of public telephones. While inheriting the demand of the PSTN services generally, the NGN shall enable the metering pulse service with the coordination of the MGC and the MG. In practical applications, however, the MGCP lacks a signal and a solution for implementing the metering pulse.

SUMMARY OF THE INVENTION

In view of the above, the present invention is to provide a method for realizing metering pulses in the Next Generation Network (NGN), which enables an MGC and an MG to cooperate as for the implementation of a metering pulse service in the NGN.

There is provided a method for realizing metering pulses in the Next Generation Network (NGN), wherein the method may include the steps of:

A. a media gateway controller delivering a metering pulse information message to a media gateway;

B. the media gateway obtaining the number of metering pulses to be transmitted and a transmission interval between two adjacent metering pulses according to the information message; and C. the media gateway transmitting the metering pulses periodically to a user equipment according to the obtained number of metering pulses to be transmitted and transmission interval between two adjacent metering pulses.

Optionally, the method may further include the step of:

terminating the transmission of the metering pulses when the media gateway detects an event or when the media gateway controller delivers an information message for interrupting the metering pulses.

Optionally, the method may further include step the of:

transmitting the metering pulses according to the transmission interval and the number of the metering pulses to be transmitted as specified by a new metering pulse information message upon the reception of the new metering pulse information message.

Optionally, the type of the metering pulses may be an On/Off or Brief signal, wherein:

the transmission of the metering pulses is continued until being terminated in the case the type of the metering pulses is the On/Off signal; and the transmission of the metering pulses comes to an end after all the metering pulses, the number of which is as specified, have been transmitted, in the case the type of the metering pulses is the Brief signal.

Optionally, the user equipment may be a digital telephone.

Optionally, the metering pulses may be defined as following:

the signal type of the metering pulses is an On/Off signal, and the pulse type and the duration are provision variables;

the parameter type of Pulse Count of a first signal parameter is an integer which is number of pulses, the possible values are non-negative integers and may be default; and the parameter type of Pulse Interval of a second signal parameter is an integer in millisecond, the possible values are positive integers and may not be default.

Optionally, the metering pulse information message may include two parameters, wherein:

the value of the first parameter indicates the number of the metering pulses to be transmitted; and the value of the second parameter indicates a total duration of the metering pulses to be transmitted.

Optionally, the transmission interval between two adjacent metering pulses may be:

the value of the second parameter divided by the value of the first parameter in the case the first parameter is larger than zero; or the transmission interval between adjacent metering pulses is the value of the second parameter in the case the first parameter is zero or unspecified.

Optionally, the metering pulse information message may include two parameters, wherein:

the value of the first parameter indicates the number of the metering pulses to be transmitted; and the value of the second parameter indicates a transmission interval between the metering pulses to be transmitted.

Actually, the number of the metering pulses to be transmitted and the transmission interval between two adjacent metering pulses may be provided in the media gateway.

Optionally, the provided number of the metering pulses to be transmitted and interval between two adjacent metering pulses may be configured in a plurality of groups, one among which may be selected according to an indication of the metering pulse information message.

Optionally, the information message may be a Media Gateway Control Protocol message.

In the present invention, a metering pulse information message may be added through an extension to the MGCP, and the number of metering pulses to be transmitted and a transmission interval between adjacent metering pulses may be obtained directly or through a calculation. When an initiation of charging is required, an MGC transmits to an MG a metering pulse signal, and the MG transmits periodically to a user equipment the metering pulses according to the number of the metering pulses and the transmission interval between metering pulses as specified by the parameters of the signal.

In such a solution, only one signal is added, with few modifications to the MG and the MGC. Therefore, such a solution can be simple and with a low cost of implementation. Moreover, the present invention can offer a support to various metering services for digital telephones through an adjustment on the parameters of the pulse signal, and enable a service, such as a public telephone service and the like, to be deployed normally in the architecture of NGN.

BRIEF DESCRIPTIONS OF THE DRAWINGS

DETAILED DESCRIPTIONS OF THE EMBODIMENTS

Figure 1:
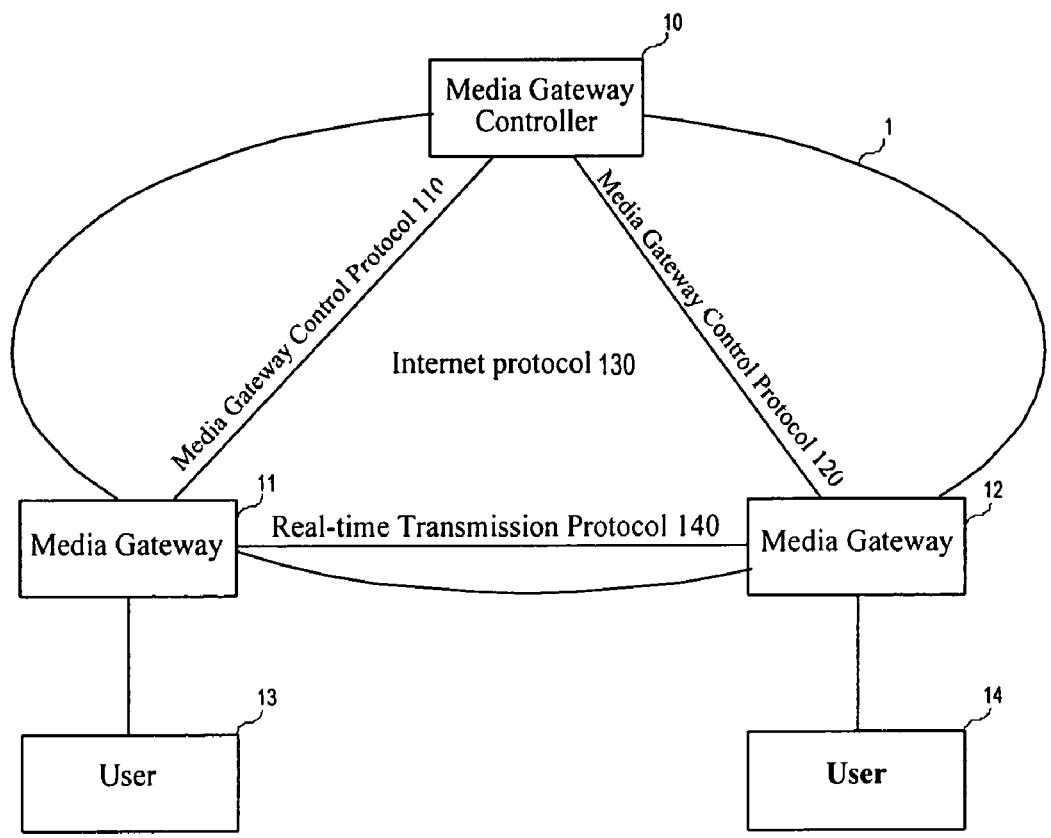
FIG. 1 is a schematic diagram of the networking mode of an MG and an MGC in the NGN of the prior art.

Hereinafter, the present invention will be further detailed in connection with the appended drawings.

The MGCP is defined by Request for Comment (RFC) 3435, RFC 3660 and RFC 3661, and these three RFCs are updated versions for RFC 2705, where RFC 3435 defines the MGCP, RFC 3660 defines the packages of the MGCP, and RFC 3661 defines the return codes of the MGCP.

As specified by RFC 3435, the MGCP may achieve its support to the new demand by extending the packages as well as the signal and event parameters therein. An embodiment of the present invention may first offer an extension to the line package among the twelve basic packages defined in RFC 3660, that is, metering pulse signal parameters may be added on the basis of the reservation of the original event, signal parameters, and the like.

The extension to the line package will be further detailed below according to the format defined in the MGCP protocol:

Line Package

Package Name: L

[The original event and signal parameters and the like are omitted here]

Signals:
Metering Pulses
Signal ID: mp
Description: through this signal, the MGC instructs the MG to apply metering pulses to a certain endpoint, the number and the interval of the applied metering pulses are specified by the MGC, and the type and the duration of the applied metering pulses are provided at the MG.
Signal Type: an On/Off signal
Duration: a provision variable
Signal Parameters:
1. Pulse Count
Parameter ID: pc
Type: an integer which is the number of pulses
Possible Values: any non-negative integer (which may be default)
Description: This defines the number of the applied metering pulses. In the case it is zero or unspecified, the repeated application of the metering pulses may be continued until being interrupted by another mechanism (e.g. upon detecting an event, or when being substituted by another signal). In the case that this parameter is larger than zero, the number of the metering pulses which is given by this parameter may be transmitted within a span of time given by the parameter of Pulse Interval.
2. Pulse Interval
Parameter ID: pi
Type: an integer in millisecond
Possible Values: any positive integer (which can not be default)
Description: This defines the time interval of the applied metering pulses (the time it takes to transmit all the metering pulses, the number of which is given by the parameter of Pulse Count). If the parameter of Pulse Count is zero or unspecified, this parameter defines the interval between pulses, i.e. the difference in time between the leading edges of two adjacent pulses. If the parameter of Pulse Count is larger than zero, this parameter indicates the span of time for producing metering pulses, the number of the metering pulses is given by the parameter of Pulse Count.
Procedures:
When an initiation of charging is required, the MGC delivers to the MG a metering pulse information message, and specifies the number and interval of the pulses in the form such as L/mp (pc, pi). The MG sends to a specified endpoint the first metering pulse immediately upon the reception of the information message, and then sends the subsequent metering pulses periodically according to the values given by the parameters of Pulse Count and Pulse Interval. Here, the information message includes the metering pulse signal.

As described above, the parameter of Pulse Interval indicates the span of time for producing the metering pulses, the number of which is given by the parameter of Pulse Count, in the case the parameter of Pulse Count is larger than zero in value. The MG can determine an appropriate interval between pulses based upon the parameter values of Pulse Interval and Pulse Count, and also the MG can adjust an individual interval to be accommodated to the case that the division is not exact.

The MG takes the value of the parameter Pulse Interval as the interval between pulses in the case the parameter Pulse Count is zero or unspecified.

The transmission of the metering pulses may be interrupted usually upon the detection of an event (often the detection of On Hook by the MG) or when the MGC delivers an information message of interrupting the metering pulses (often a blank signal delivered by the MGC).

In accordance with the embodiments of the present invention, the followings may be noted regarding the above extension to the signal parameters of the line package.

First of all, the line package already contains thirty-four basic parameters of event or signal, such as Answer Tone (AW), Busy Tone (BZ) and so on, which are not enumerated fully here, and on which more information is detailed in RFC 3660.

Secondly, as defined in the signal of Metering Pulse, the default type of signal (Signal Type) is the On/Off signal. However, the parameter of Signal Type can be explicitly set as a Brief signal to override this default type, so that it ends up with the case that all the metering pulses, the number of which is given by the parameter of Pulse Count, are transmitted within the span of time given by the parameter of Pulse Interval. It shall be noted that signal types can be classified into three types, that is, an On/Off signal (OO), a Time-out signal (TO) and a Brief signal (BR), as defined in RFC 3660. The OO signal indicates that the signal is valid at the MG all the time, and the On/Off state is controlled by the MGC. If no new signal is sent from the MGC within a total period of a pulse sequence, the MG may deliver pulses with the signal type in the next period maintains in the original state. The TO signal is a time-limited signal with a corresponding timer at the MGC, and comes to an end when the timer ends up. The BR signal indicates that the signal is completed at one time, and is valid during only the duration as given by the parameter of Pulse Interval, in other words, it ends up when all the individual pulses within the total period of a pulse sequence are transmitted and no more pulse is transmitted, while the MG will wait and will not response until a new signal is transmitted from the MGC. Also, RFC 3600 allows a substitution of a certain signal type for the default signal type.

Moreover, as described with reference to the Procedure, the form, in which the specified number and interval of pulses are sent from the MGC to the MG, is L/mp(pc, pi), which is specified strictly according to RFC 3435. That is, the format of the extended package is specified as: Package Name/Event or Signal Name (Parameter). Obviously, L is the Package Name, mp is the Signal Name of the extended metering pulse signal, and pc and pi are IDs of the parameters of Pulse Count and Pulse Interval.

Finally, the frequency, at which the metering pulses are repeatedly applied, can be changed in such a way that a new metering pulse signal is used and a new parameter of Pulse Interval is designated. That is, the MGC may send a new mp to the MG at any time, the pc and the pi contained therein are different from the mp which the MGC sent previously to the MG, for the purpose of changing the total period of a pulse sequence and the period of a single pulse delivered from the MG. Also since the MGC may send to the MG at any time a new mp to change the interval of the pulses delivered from the MG, it shall be noted that, such changes include a separate change in the total period of a pulse sequence, or a separate change in the period of a single pulse, or both. To ensure the integrity of the pulse sequence delivered from the MG, the MGC needs to set a flag of KeepActive for this metering pulse signal. The MG shall not, even upon the reception of a new mp from the MGC, turn to use the new pulse interval until the next single pulse transmitted from the current pulse sequence ends up. The integrity of the application of the metering pulses shall be guaranteed, that is, once a certain single pulse starts to be transmitted, the transmission shall not be interrupted within a provision duration due to the detection of an event or any other reason, so that the charging rate can be kept from any occurrence of errors.

After the extension to the signal parameters of the MGCP line package, an extension to the MGCP may then be implemented to achieve a metering pulse mechanism, so as to embody the present embodiment.

Figure 2:
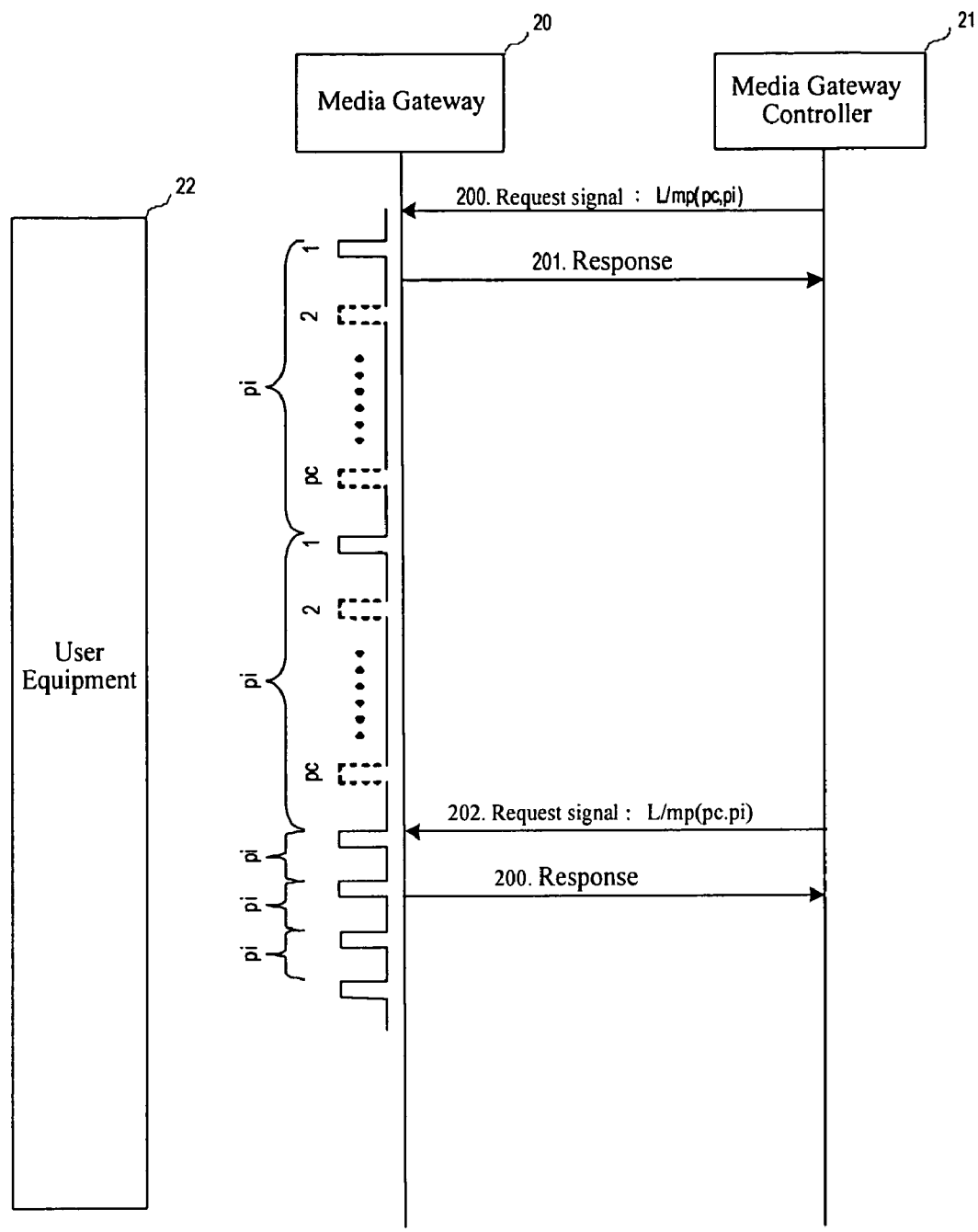
FIG. 2 is a flow diagram of metering pulse signaling implemented through an extension to the MGCP according to an embodiment of the present invention.

Generally speaking, the embodiment of the present invention can provide a simulation in the NGN of the metering pulse mechanism adopted by the circuit program controlled exchange of the previous generation. The pulses in the metering pulse mechanism of the circuit program controlled exchange are controlled and delivered by the program controlled exchange to public telephones connected therewith. In the NGN, the function of the program controlled exchange is substituted by the MGC and the MG. As introduced in the Background of the Invention, the cooperation between the MGC and the MG is obviously required for the implementation of the metering pulse mechanism in the NGN environment. FIG. 2 is schematic diagram of the signaling related to the metering pulse mechanism therebetween.

As shown in FIG. 2, a media gateway 20 and a media gateway controller 21 are respectively at the two ends of a signaling stream of the extended MGCP to implement the metering pulse mechanism, and a user 22 is a telephone terminal under the control of the media gateway 20, typically a public telephone.

First in step 200, when the media gateway controller 21 needs to initiate the charging, a request signal is delivered to the media gateway 20, which is an extended line package as described above, that is, the package contains the extended metering pulse signal mp and the specific parameters pc and pi contained in the mp. The media gateway 20 triggers and transmits the first pulse to the user 22 upon the reception of the metering pulse signal sent from the media gateway controller 21, and then transmits the subsequent pulses periodically as defined by the parameters of the signal. Typically, the transmission of the metering pulses may be interrupted when the media gateway 20 detects an event or the media gateway controller 21 delivers any other signals containing no metering pulse to replace the current signal. Here, this event refers to any event except that a signal contains a specific flag indicating that the transmission of pulses needs not to be terminated, this flag is the flag of KeepActive mentioned above.

Then in step 201, the media gateway 20 sends a response signal to the media gateway controller 21 after it receives the mp and transmits the metering pulses to the user 22 according to the pc and pi contained in the mp. It shall be noted that the media gateway 20 would keep transmitting periodic pulses to the user 22 until the media gateway controller 21 delivers a new mp, and in the case the value of the parameter pc is larger than zero, an appropriate interval for a single pulse may be determined according to the ratio "pi/pc" of the pc and the pi in the mp. Here, the two parameters of pi and pc are total values for counting, pi indicates a total period of a pulse sequence, and pc indicates how many pulses are contained in that pulse sequence, and the ratio thereof is a period of a single pulse. It shall be further noted that such a way of determining an appropriate interval for a single pulse is for the purpose of being accommodated to various digital telephones, because the pulse-metering approaches of the digital telephones are slightly different from each other. Also, the MG can adjust an individual interval so as to be accommodated to the case of no exact division. The metering pulses between step 210 and step 202 in FIG. 2 are in the case that the value of the parameter pc is larger than zero, and the metering pulses continue to be transmitted the same way as before after one period of pi ends up, so it shall be obvious that the default signal type of the mp transmitted in step 200 are the type of OO.

Next, the media gateway controller 21 may deliver a new request signal to the media gateway 20 in step 202 if the interval of the metering pulses needs to be changed, where the pc and the pi contained in the mp may have been reconfigured already. It shall be noted that the new interval of the pulses may not be put in effect until the next pulse is transmitted from the current pulse sequence.

Finally in step 203, the media gateway 20 transmits a response signal to the media gateway controller 21. Also it shall be noted that the media gateway 20 may take the value of the parameter pi directly as the interval between single pulses in the case the new value of the parameter pc is zero or unspecified. The metering pulses subsequent to step 203 in FIG. 3 are in the case that the new value of the parameter pc is zero or unspecified.

The implementation of the metering pulse mechanism with the extended MGCP has been detailed as above, and FIG. 2 also illustrates the changes in the interval of the metering pulses due to most of the signaling.

It shall be noted that the parameter pc, in the request signal that the media gateway controller 21 may deliver to the media gateway 20 in step 202, may also indicate a transmission interval of the metering pulses to be transmitted. In another embodiment of the present invention, the total number of the metering pulses and the transmission interval between two adjacent metering pulses may be provided at the media gateway, so that the total number of the metering pulses and the transmission interval between two adjacent metering pulses can be obtained directly once the media gateway receives a request for charging. Furthermore, the provided total number of the metering pulses and transmission interval between two adjacent metering pulses may be configured in a plurality of groups, and the media gateway controller may give an indication for choosing according to the requirement on metering in the request delivered to the media gateway, so that the media gateway may select one among the groups according to the indication of the metering pulse information message, thereby the control over the metering is more flexible.

While the present invention has been illustrated and described with reference to some preferred embodiments thereof, those skilled in the art shall recognize that various changes in the form and the detail thereof can be made without departing from the spirit and scope of the present invention as defined by the accompanied claims.

The invention claimed is:

1. A method for realizing metering pulses in the Next Generation Network (NGN), comprising the steps of:
    delivering a metering pulse information message from a media gateway controller to a media gateway, the metering pulse information message including an indication of a particular group of metering pulse information to be selected by the media gateway;
    selecting, by the media gateway, one of a plurality of groups of metering pulse information provided at the media gateway according to the indication of the particular group of metering pulse information to be selected, each of the plurality of groups of metering pulse information including a respective total number of metering pulses to be transmitted and a respective transmission interval between two adjacent metering pulses; and
    transmitting, by the media gateway, metering pulses periodically to a user equipment according to the number of metering pulses to be transmitted and the transmission interval between two adjacent metering pulses included in the selected group of metering pulse information.

2. The method according to claim 1, wherein the method further comprises the step of:

terminating the transmission of the metering pulses when the media gateway detects an event or when the media gateway controller delivers an information message for interrupting the metering pulses.

3. The method according to claim 1, wherein a type of the metering pulses is an On/Off or a Brief signal, and if the type of the metering pulses is the On/off signal, the transmission of the metering pulses is continued until being terminated; and if the type of the metering pulses is the Brief signal, the transmission of the metering pulses comes to an end after a number of metering pulses equal to the selected number of metering pulses to be transmitted, have been transmitted.

4. The method according to claim 1, wherein the user equipment is a digital telephone.

5. The method according to claim 1, wherein the metering pulses are defined by:

a signal type of the metering pulses that is an On/Off signal, and a pulse type and a duration of the metering pulses that are provision variables;

a parameter type of a Pulse Count of a first signal parameter is a non-negative integer which defines a number of pulses and has a default value; and a parameter type of a Pulse Interval of a second signal parameter is a positive integer which defines a number of milliseconds and does not have a default value.

6. The method according to claim 1, wherein the information message is a media Gateway Control Protocol message.

* * * * *